US010371950B2

(12) United States Patent
Dobschal et al.

(10) Patent No.: US 10,371,950 B2
(45) Date of Patent: Aug. 6, 2019

(54) IMAGING OPTICAL UNIT FOR GENERATING A VIRTUAL IMAGE AND SMARTGLASSES

(71) Applicant: Carl Zeiss Smart Optics GmbH, Aalen (DE)

(72) Inventors: Hans-Juergen Dobschal, Kleinromstedt (DE); Karsten Lindig, Erfurt (DE)

(73) Assignee: tooz technologies GmbH, Aalen (DE)

( * ) Notice: Subject to any disclaimer, the term of this patent is extended or adjusted under 35 U.S.C. 154(b) by 0 days.

(21) Appl. No.: 15/538,653

(22) PCT Filed: Dec. 10, 2015

(86) PCT No.: PCT/EP2015/079251
§ 371 (c)(1),
(2) Date: Jun. 21, 2017

(87) PCT Pub. No.: WO2016/102190
PCT Pub. Date: Jun. 30, 2016

(65) Prior Publication Data

US 2017/0357093 A1 Dec. 14, 2017

(30) Foreign Application Priority Data

Dec. 23, 2014 (DE) ........................ 10 2014 119 550

(51) Int. Cl.
*G02B 27/01* (2006.01)
*G02B 3/08* (2006.01)
(Continued)

(52) U.S. Cl.
CPC ........... *G02B 27/0172* (2013.01); *G02B 3/08* (2013.01); *G02B 27/143* (2013.01); *G02B 27/4205* (2013.01); *G02B 2027/0178* (2013.01)

(58) Field of Classification Search
CPC .......... G02B 27/0101; G02B 2027/0105–0136
(Continued)

(56) References Cited

U.S. PATENT DOCUMENTS 6,825,987 B2 * 11/2004 Repetto .............. G02B 27/0172 345/6
8,059,342 B2 * 11/2011 Burke ................ G02B 27/0101 345/8
(Continued)

FOREIGN PATENT DOCUMENTS

| | | | |
|---|---|---|---|
| DE | 102013223964 | B3 | 5/2015 |
| EP | 1385023 | A1 | 1/2004 |
| WO | 2008089992 | A1 | 7/2008 |

OTHER PUBLICATIONS

The International Search Report and Written Opinion rendered by the International Searching Authority for PCT/EP2015/079251, dated Feb. 11, 2016, 21 pages.
(Continued)

*Primary Examiner* — Nicholas R. Pasko
(74) *Attorney, Agent, or Firm* — Skaar Ulbrich Macari, P.A.

(57) ABSTRACT

An imaging optical unit for generating a virtual image of an initial image represented on an image generator includes at least one spectacle lens, an input coupling device for coupling an imaging beam path emanating from the initial image in between the inner surface and the outer surface of the spectacle lens, and a Fresnel structure present in the spectacle lens for coupling the imaging beam path out from the spectacle lens in the direction of the eye. The input coupling device couples the imaging beam path in between the inner surface and the outer surface of the spectacle lens in such a way that it is guided by reflections between the inner surface and the outer surface to the Fresnel structure. The Fresnel structure has Fresnel surfaces, which bring
(Continued)

about a base deflection of the rays of the imaging beam path by 45 to 55 degrees.

15 Claims, 4 Drawing Sheets

(51) Int. Cl.
*G02B 27/14* (2006.01)
*G02B 27/42* (2006.01)

(58) Field of Classification Search
USPC .................................................. 359/629–633
See application file for complete search history.

(56) References Cited

U.S. PATENT DOCUMENTS 8,456,744 B2 6/2013 Dobschal et al.
8,467,132 B2 6/2013 Dobschal et al.
8,810,914 B2 * 8/2014 Amitai ................. H04N 13/344 359/633
2002/0186179 A1 * 12/2002 Knowles ........... G02B 27/0172 345/8
2006/0126181 A1 6/2006 Levola
2006/0228073 A1 10/2006 Mukawa et al.
2007/0008624 A1 * 1/2007 Hirayama .......... G02B 27/0081 359/630
2010/0171922 A1 7/2010 Sessner et al.
2010/0220295 A1 9/2010 Mukawa et al.
2011/0164294 A1 * 7/2011 Shimizu ............. G02B 27/0172 359/13
2012/0002294 A1 * 1/2012 Dobschal ........... G02B 27/0172 359/630
2012/0002295 A1 * 1/2012 Dobschal ................. G02B 3/08 359/630
2012/0098734 A1 * 4/2012 Totani ................ G02B 27/0172 345/7
2012/0249899 A1 * 10/2012 Berthelot ................. G02B 3/08 349/13
2013/0215516 A1 * 8/2013 Dobschal ........... G02B 27/0172 359/630
2014/0226215 A1 * 8/2014 Komatsu ............ G02B 27/0172 359/631
2014/0293434 A1 10/2014 Cheng et al.
2015/0323788 A1 * 11/2015 Zou ........................ G02B 27/30 359/630
2016/0299344 A1 10/2016 Dobschal et al.

OTHER PUBLICATIONS

Office Action to priority application German Patent Application No. 10 2014 119 550.7 rendered by the German Patent and Trade Mark Office (DPMA) dated Aug. 18, 2015, 5 pages.

* cited by examiner

IMAGING OPTICAL UNIT FOR GENERATING A VIRTUAL IMAGE AND SMARTGLASSES

PRIORITY

This application claims the benefit of German Patent Application No. 102014119550.7, filed on Dec. 23, 2014, which is hereby incorporated herein by reference in its entirety.

FIELD

The present invention relates to an imaging optical unit for generating a virtual image and to smartglasses comprising an optical apparatus of this type.

BACKGROUND

Smartglasses are a special form of a Head Mounted Display. One conventional form of Head Mounted Displays uses screens that are worn in front of the eyes and present the user with computer-generated images or images recorded by cameras. Such Head Mounted Displays are often voluminous and do not allow direct perception of the surroundings. It is only relatively recently that Head Mounted Displays have been developed which are able to present the user with an image recorded by a camera or a computer-generated image without preventing direct perception of the surroundings. Such Head Mounted Displays, which are referred to as smartglasses hereinafter enable this technology to be utilized in everyday life.

Smartglasses can be provided in various types. One type of smartglasses, which is distinguished in particular by its compactness and aesthetic acceptance, is based on the principle of waveguiding in the spectacle lens. In this case, light generated by an image generator is collimated outside the spectacle lens and coupled in via the end face of the spectacle lens, from where it propagates via multiple total internal reflection to a point in front of the eye. An optical element situated there then couples out the light in the direction of the eye pupil. In this case, the input coupling into the spectacle lens and the output coupling from the spectacle lens can take place either diffractively, reflectively or refractively. In the case of diffractive input or output coupling, diffraction gratings having approximately the same number of lines are used as input and output coupling elements, the greatly dispersive effects of the individual gratings being compensated for among one another. Input and output coupling elements based on diffraction gratings are described for example in US 2006/0126181 A1 and in US 2010/0220295 A1. Examples of smartglasses comprising reflective or refractive input or output coupling elements are described in US 2012/0002294 A1.

Smartglasses in which an imaging beam is guided with multiple reflection from an input coupling element to an output coupling element, irrespective of whether diffractive, reflective or refractive elements are used as input and output coupling elements, have in common the problem of the so-called "Footprint Overlap". This problem, which limits the size of the field of view (FOV) and the size of the exit pupil of the smartglasses at the location of the eyebox and on account of which a relatively high spectacle lens thickness is necessary, is explained in greater detail below with reference to FIGS. 5 and 6.

The eyebox is that three-dimensional region of the light tube in the imaging beam path in which the eye pupil can move, without vignetting of the image taking place. Since, in the case of smartglasses, the distance of the eye with respect to the smartglasses is substantially constant, the eyebox can be reduced to a two-dimensional eyebox that only takes account of the rotational movements of the eye. In this case, the eyebox substantially corresponds to the exit pupil of the smartglasses at the location of the entrance pupil of the eye. The latter is generally given by the eye pupil. Although smartglasses are a system with which an imaging beam path runs from the image generator to the exit pupil of the smartglasses, for an understanding of the "Footprint Overlap" it is helpful to consider the beam path in the opposite direction, that is to say from the exit pupil to the image generator. Therefore, a light tube emanating from the exit pupil of the smartglasses is considered in the following explanations, wherein the boundaries of the light tube are determined by the field of view angles of the beams propagating from every point of the eyebox in the direction of the spectacle lens.

After refraction at the inner surface 103 of the spectacle lens 101, the rays in the light tube impinge on the outer surface 105 of the spectacle lens 101. The output coupling structure 107 is situated in said outer surface and extends in a horizontal direction from the point B to the point C. The distance between the points B and C is determined by the desired extent of the light tube, which in turn depends on the desired size of the eyebox 109 and the desired field of view angle. The field of view angle here is primarily the horizontal field of view angle, which concerns that angle relative to the axis of vision at which the horizontal marginal points of the image field are incident in the pupil. The axis of vision here denotes a straight line between the fovea of the eye (point of sharpest vision on the retina) and the midpoint of the image field. FIG. 5 illustrates the profile of the light tube given an eyebox diameter E and a thickness d of the spectacle lens 101 for a relatively small field of view angle. All rays of the light tube are diffracted or reflected from the output coupling structure 107 in the direction of the inner surface 103 of the spectacle lens 101 and from there are reflected back to the outer surface 105 of the spectacle lens 101, from where they are reflected back again onto the inner surface 103 of the spectacle lens 101. This reflection back and forth takes place until the input coupling element is reached, from where the light tube then progresses further in the direction of the image generator.

If, as illustrated in FIG. 5, the field of view angle is relatively small, the rays of the light tube, after the first reflection at the inner surface 103 of the spectacle lens 101, impinge on a region of the outer surface 105 of the spectacle lens 1 which lies outside the output coupling element 107 (in FIG. 5 on the right next to the point B). By contrast, if a large field of view angle is desired, as is illustrated in FIG. 6, a correspondingly enlarged output coupling structure 107' is necessary. However, this has the effect that rays of the light tube which impinge on that section of the output coupling structure 107' which is located between the points A and C, after the first reflection at the inner surface 103 of the spectacle lens 101, are reflected back onto a region of the outer surface 105 of the spectacle lens 101 in which the output coupling structure 107' is still situated. This region, referred to hereinafter as overlap region, is situated between the points B and D in FIG. 6. Owing to the presence of the output coupling element, which may be a diffractive or reflective output coupling element in the illustration selected in FIG. 6, the rays reflected from the inner surface 103 of the spectacle lens 101 into the region between B and D are not reflected back in the direction of the inner surface 103, such that they are lost for the imaging.

A similar problem also occurs if the diameter of the eyebox is increased rather than the field of view angle. In this case, too, there would be points A and C between which there is situated a region which reflects rays in the direction of the inner surface 103 of the spectacle lens 101 which are reflected back from there once again into a region of the output coupling structure 107' that is identified by the points B and D, and are therefore unusable for the imaging. The same would also correspondingly hold true if the eyebox diameter E and the field of view angle were maintained and in return the thickness d of the spectacle lens were reduced. In other words, a sufficiently large eyebox diameter E in conjunction with a sufficiently large field of view angle can be achieved only with a certain minimum thickness d of the spectacle lens.

It should be pointed out once again at this juncture that the beam path was reversed for the above consideration, and that the actual beam path runs from the image generator into the exit pupil of the smartglasses. This does not change anything about the fundamental consideration, however, since rays which come from the image generator and which impinge on the output coupling structure 107' in the region between the points B and D are not reflected into the exit pupil since they are not reflected back in the direction of the inner surface of the spectacle lens, which would be necessary, however, in order to reach the region of the output coupling structure 107' between the points A and C, from where they could be coupled out in the direction of the exit pupil.

SUMMARY

An object of the present invention to provide an optical apparatus for smartglasses with which the described problem of the "Footprint Overlap" can be reduced. Moreover, it is a second object of the present invention to provide advantageous smartglasses.

The first object is achieved, for example, by means of an imaging optical unit as claimed in claim 1, and the second object, for example, by means of smartglasses as claimed in claim 12. The dependent claims contain additional advantageous example configurations of the invention.

The disclosure includes an imaging optical unit for generating a virtual image of an initial image represented on an image generator, comprising:

- at least one spectacle lens to be worn in front of the eye, said spectacle lens having an inner surface that is to face the eye and an outer surface that is to face away from the eye,
- an input coupling device for coupling an imaging beam path emanating from the initial image in between the inner surface and the outer surface of the spectacle lens, and
- a Fresnel structure present in the spectacle lens and serving for coupling the imaging beam path out from the spectacle lens in the direction of the eye.

The input coupling device couples the imaging beam path in between the inner surface and the outer surface of the spectacle lens in such a way that it is guided by reflections between the inner surface and the outer surface to the Fresnel structure. In this case, the reflection can be a total internal reflection or a reflection at a reflective layer of the smartglasses. In addition, the Fresnel structure has Fresnel surfaces, which bring about a base deflection of the rays of the imaging beam path by 45 to 55 degrees. In this case, the term "base deflection" should be understood to mean the total deflection of a zero ray, wherein a zero ray is a ray for which, in the radian measure, the approximation $\sin \alpha \approx \tan \alpha \approx \alpha$ holds true, wherein $\alpha$ denotes its angle with respect to the optical axis. Zero rays are thus rays for which the paraxial approximation holds true.

In the imaging optical unit according certain examples, the base deflection of the rays of the imaging beam path is coordinated by the Fresnel structure in such a way that, on the one hand, the Footprint Overlap is kept small and, on the other hand, shading effects and imaging aberrations can be kept small. By way of example, in the case of base deflections greater than 55 degrees, shading effects at the Fresnel structure would become so large that they would destroy the imaging. Furthermore, upon exceeding the angle of 55 degrees, the tendency toward imaging aberrations would also be intensified. By contrast, in the case of deflections smaller than 45 degrees, the Footprint Overlap would significantly intensify and have a greatly disturbing influence on the imaging.

In the context of the imaging optical unit according to certain examples, it is advantageous if the input coupling device couples the imaging beam path in between the inner surface and the outer surface of the spectacle lens in such a way that the imaging beam path is guided via four reflections to the Fresnel structure. With fewer than four reflections it would be difficult to comply with a maximum base deflection of the rays of the imaging beam path of 55 degrees at the Fresnel structure, and with more than four reflections the angles of incidence on the spectacle lens surface would have to be greatly reduced since otherwise the image generator would have to be arranged too far away from the head of the wearer of the smartglasses provided with the imaging optical unit, which is undesirable for aesthetic and practical reasons.

In the optical apparatus according to certain examples, an edge thickening can be present in the spectacle lens between the input coupling device and the Fresnel structure, in which edge thickening the thickness of the spectacle lens is greater than in the region of the Fresnel structure. The edge thickening at the indicated location of the spectacle lens serves to reduce the Footprint Overlap even in the case of a relatively thin spectacle lens. The thickening of the spectacle lens in the region of the edge thickening is less disturbing here than if the entire spectacle lens were thickened. Given the presence of an edge thickening, the input coupling device preferably couples the imaging beam path in between the inner surface and the outer surface of the spectacle lens in such a way that the first reflection takes place after the input coupling at the outer surface of the spectacle lens and the second reflection takes place after the input coupling in the region of the edge thickening at a reflection surface arranged on the inner side of the spectacle lens. If the edge thickening were present in the region of a third or fourth reflection, it would considerably influence the view through the spectacles since, with the spectacles put in place, it would then be situated nearer to the center of the field of view. On the other hand, given a base deflection of the rays of the imaging beam path at the Fresnel structure by 45 to 55 degrees, the edge thickening makes it possible to reduce the Footprint Overlap, such that the edge thickening should not be completely dispensed with. The position in the region of the second reflection, that is to say the first reflection at the inner surface of the spectacle lens, thus represents a compromise which, on the one hand, makes it possible to reduce the Footprint Overlap and, on the other hand, impairs the view through the spectacle lens only at the edge of the field of view of the wearer of smartglasses provided with the imaging optical unit according to the invention, such that the impairment of vision possibly resulting from the edge thickening is not disturbing or only slightly disturbing.

In the imaging optical unit according to certain examples, it is additionally advantageous if the Fresnel structure has a focal length of at least 80 mm, such that it does not contribute or scarcely contributes to the refractive power shaping the imaging. In other words, the Fresnel surfaces have a predominantly deflecting function in the imaging optical unit according to the invention. The main part of the refractive power required for the imaging can then be provided by a collimation optical unit integrated into the input coupling device and serving for collimating the imaging beam path. For this purpose, the input coupling device can comprise for example an entrance surface and also a first mirror surface and a second mirror surface. One or a plurality of these surfaces then forms or form the collimation optical unit. In particular, the entrance surface, the first mirror surface and the second mirror surface together can also form the collimation optical unit. If the Fresnel structure has a focal length of 80 mm or more, that is to say that the refractive power required for generating the virtual image is substantially provided by the collimation optical unit, it is advantageous if the collimation optical unit has a focal length in the range of between 20 and 30 mm. In this case, the user of smartglasses equipped with an imaging optical unit according to the invention can be given the impression that the scene represented by the virtual image is situated at a distance of a few meters in front of the eye.

By virtue of the segmentation of the Fresnel structure with simultaneous proximity to the pupil, imaging aberrations that occur in the imaging beam path are influenced disadvantageously if the Fresnel surface is provided with an excessively high refractive power. This effect is all the greater, the deeper the Fresnel surfaces are chosen. A certain minimum depth is necessary, however, in order to provide the mutually incoherent Fresnel surfaces with a sufficiently large aperture. Fresnel zone depths for the Fresnel surfaces of between 0.35 and 0.5 mm have proved to be an advantageous compromise. In other words, the steps between the individual Fresnel surfaces have heights of between 0.35 and 0.5 mm.

In the imaging optical unit according to certain examples, the reflection surface arranged on the inner surface of the spectacle lens in the region of the edge thickening can be a freeform surface that at least partly corrects imaging aberrations. In this case, a freeform surface should be understood to mean a planar, spherical, elliptical or hyperbolic surface on which a surface defined by a polynomial in the x- and y-directions is superimposed, where the x-direction and the y-direction are defined in a plane to which the optical axis, running in the z-direction, is perpendicular. In addition or as an alternative to the freeform surface formed by the inner side of the spectacle lens in the region of the edge thickening, the first mirror surface of the input coupling device can form a freeform surface that at least partly corrects imaging aberrations, and/or the second mirror surface of the input coupling device can form a freeform surface that at least partly corrects imaging aberrations, and/or the entrance surface of the input coupling device can form a freeform surface that at least partly corrects imaging aberrations. Configuring the inner side of the spectacle lens in the region of the edge thickening as a freeform surface that at least partly corrects imaging aberrations has the advantage here that it is possible to intervene with regard to the imaging quality still relatively near the pupil in comparison with the other surfaces mentioned. Overall it is advantageous, however, if a plurality of freeform surfaces are present, since then even a plurality of imaging aberrations can be simultaneously influenced separately.

In one advantageous example configuration of the imaging optical unit, the inner side of the spectacle lens in the region of the edge thickening, the first mirror surface of the input coupling device, the second mirror surface of the input coupling device and also the entrance surface of the input coupling device are embodied in each case as conic section surfaces on which a freeform surface is superimposed. In this way, in addition to being used for correcting imaging aberrations, the surfaces mentioned can also be used for providing refractive power.

In the context of the imaging optical unit according to certain examples, it is advantageous if the spectacle lens has a radius of curvature of between 100 mm and 150 mm, in particular between 120 and 140 mm. Radii of curvature in this range are firstly pleasant and secondly tenable with regard to the imaging quality of the imaging optical unit. Other radii of curvature would be detrimental either to ergonomics or to the imaging quality. It should be noted at this juncture that the radii of curvature of the outer surface and the inner surface of the spectacle lens are substantially identical, that is to say have a deviation of less than 1% from one another, if no defective vision is intended to be corrected by the spectacle lens. If defective vision is to be corrected by the spectacle lens at the same time, relatively large deviations between the radii of curvature of the outer surface and the inner surface can occur.

It is advantageous if the spectacle lens and the input coupling device of the imaging optical unit according to certain examples form a unit, in particular a monolithic unit, that is to say that apart from the input surface of the input coupling device, at which the imaging beam path enters the input coupling device, and the surface at which the imaging beam emerges from the spectacle lens in the direction of the eye, no further interfaces with glass-air transition are present. The latter usually have the disadvantage that, primarily upon oblique passage through said surfaces, chromatic aberrations and other higher-order aberrations occur, which can be corrected only in a complex fashion. Moreover, such transitions cause high sensitivities with regard to tilting and position tolerances.

Smartglasses according to certain examples are equipped with an imaging optical unit according to the invention for generating a virtual image. The properties and advantages described with regard to the imaging optical unit according to the invention are therefore likewise realized in the smartglasses according to the invention. The smartglasses according to the invention thus have a small footprint overlap and at the same time small shading effects. Moreover, with the aid of the freeform surfaces mentioned, it is possible to correct imaging aberrations in the imaging beam path, such that the smartglasses according to the invention can be realized with only small imaging aberrations.

Further features, properties and advantages of the present invention will become apparent from the following description of exemplary embodiments with reference to the accompanying figures.

Figure 1:
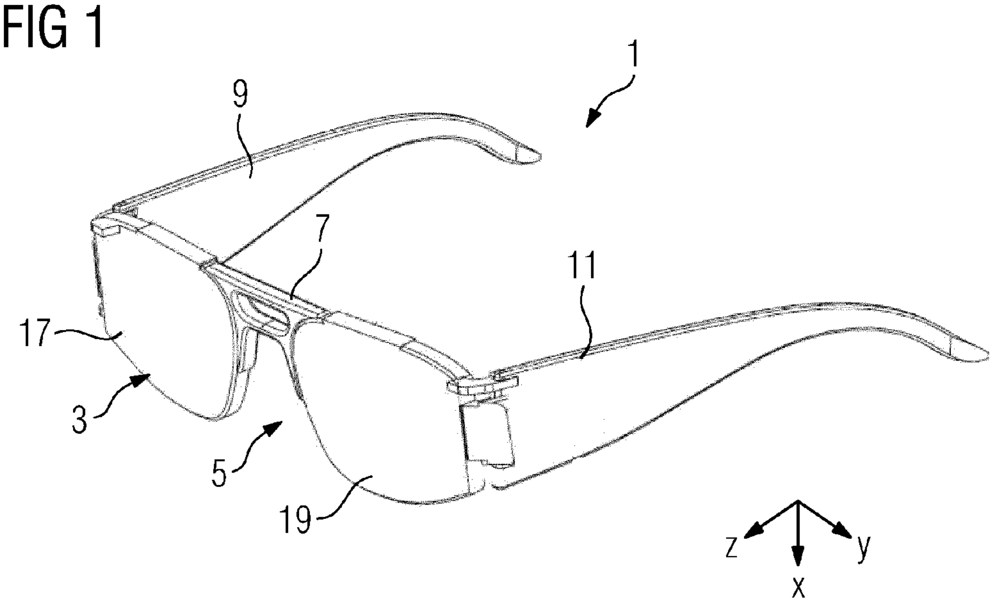
FIG. 1 shows smartglasses in a perspective illustration.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The imaging optical unit according to the invention is described below on the basis of the example of smartglasses equipped with such an imaging optical unit.

Figure 2:
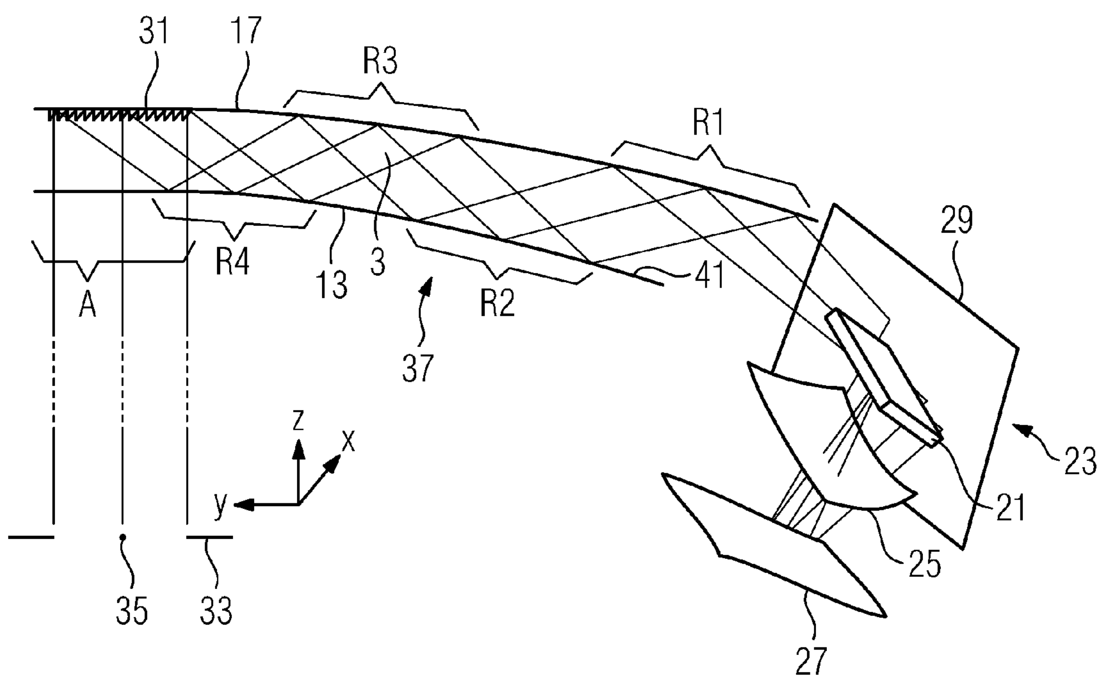
FIG. 2 shows a spectacle lens and an input coupling device of the smartglasses from FIG. 1 in a schematic illustration.
Figure 3:
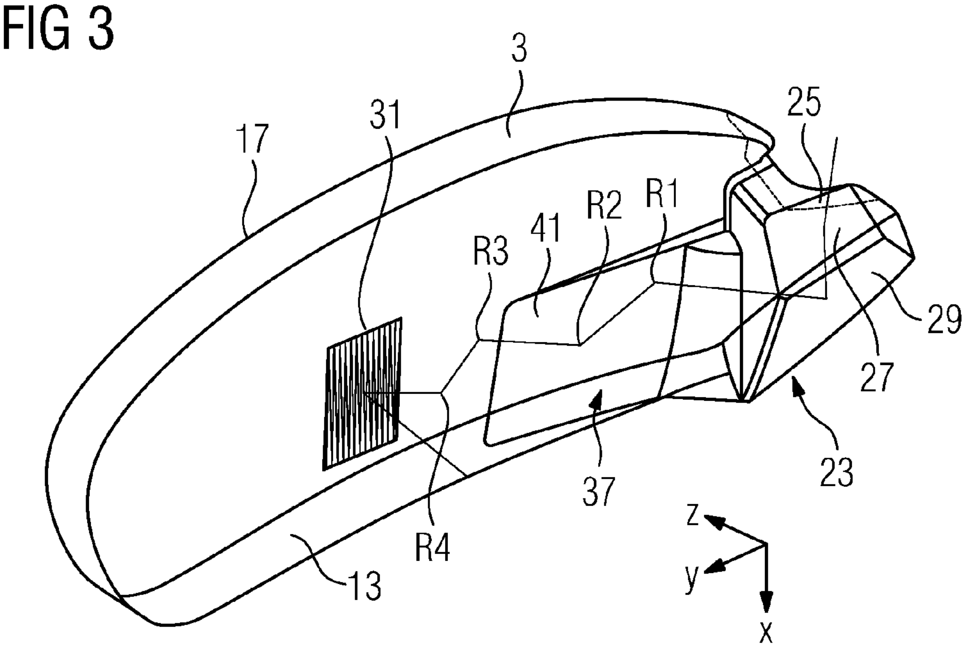
FIG. 3 shows the spectacle lens and the input coupling device in a perspective illustration.

Smartglasses 1 equipped with an imaging optical unit according to the invention are shown in FIG. 1. The imaging optical unit itself, which comprises a spectacle lens 3 and an input coupling device 23, is shown in FIGS. 2 and 3, wherein FIG. 2 shows the imaging optical unit in a schematic illustration for elucidating its functioning and FIG. 3 shows a typical configuration of the imaging optical unit in a perspective illustration.

The smartglasses 1 comprise two spectacle lenses 3, 5, which are held by a spectacle frame 7 with two spectacle earpieces 9, 11. The lenses each have an inner surface 13, 15 (visible in FIGS. 2 and 3) facing the user's eye with the spectacles put in place, and an outer surface 17, 19 (visible in FIGS. 1 and 2) facing away from the user's eye. In the present exemplary embodiment, an image generator 21 (shown in FIG. 2) is situated in the spectacle earpiece 9 or between the spectacle earpiece 9 and the spectacle lens 17, which image generator may be embodied for example as a liquid crystal display (LCD display), as a display based on light emitting diodes (LED display) or as a display based on organic light emitting diodes (OLED display). An input coupling device 23 is arranged between the image generator 21 and the spectacle lens 3, which input coupling device, in the present exemplary embodiment, has an entrance surface 25, a first mirror surface 27 and a second mirror surface 29 and is embodied as a block of glass or transparent plastic, wherein the entrance surface 25 and the mirror surfaces 27, 29 are formed by surfaces of the block (see FIG. 3). Like the block forming the input coupling device 23, the spectacle lens 3 can also be produced from glass or transparent plastic.

In the present exemplary embodiment, the block forming the input coupling device 23 and the spectacle lens 3 are embodied in a monolithic fashion, that is to say that there is no interface and thus no air gap present between the block and the spectacle lens 3. Particularly upon oblique passage through surfaces of the spectacle lens or of the block adjoining air, chromatic aberrations and other higher-order aberrations would occur, which can be avoided by the embodiment without an air gap. Complex correction means would be necessary for such chromatic aberrations or higher-order aberrations. Moreover, air gaps would have high sensitivities to tilting and position tolerances, which can likewise be avoided by the monolithic configuration of the block forming the input coupling device and the spectacle lens. However, the described monolithic configuration of block and spectacle lens 3 is not absolutely necessary. An air gap between block and spectacle lens 3 can also be avoided if the block and the spectacle lens 3 are shaped as separate units and subsequently cemented to one another. If the block forming the input coupling device 23 and the spectacle lens 3 consist of two units cemented to one another, it goes without saying that both can also be produced from different materials. It is preferred, however, for the block forming the input coupling device 23 and the spectacle lens 3 to be embodied in a monolithic fashion, that is to say without an interface between them.

The input coupling device 23 serves not only for coupling the imaging beam path emanating from the image generator 21 into the spectacle lens 3 but also for collimating the divergent beams of the imaging beam path that emanate from the pixels of the initial image represented by the image generator 21. For this purpose, in the present exemplary embodiment, the entrance surface 25, the first mirror surface 27 and the second mirror surface 29 have correspondingly curved surfaces, wherein the entrance surface 25 is embodied as an ellipsoidal surface and the two mirror surfaces 27, 29 are embodied in each case as hyperbolic surfaces. These curvatures represent the basic curvatures of said surfaces. In the present exemplary embodiment, freeform surfaces given by polynomials in x and y are superimposed on the basic curvatures of said surfaces 25, 27, 29, when x and y represent coordinates of a coordinate system whose z-axis corresponds to the optical axis of the imaging beam path. The z-coordinate of the surfaces in the imaging apparatus 23 are then defined by the sum of the z-coordinate given by a conic section surface (basic curvature) and a z-coordinate given by the polynomial (freeform surface). The function of the freeform surfaces will be explained later.

The spectacle lens 3 and the input coupling device 23 together form the imaging optical unit of the smartglasses 1, which generates a virtual image of the initial image represented on the image generator.

The input coupling device 23 couples the imaging beam path collimated by means of the entrance surface 25 and the two mirror surfaces 27, 29 into the spectacle lens 3 between the inner surface 13 and the outer surface 17. In the spectacle lens 3, the imaging beam path is then guided by means of reflections at the outer surface 17 and the inner surface 13 of the spectacle lens 3 to a Fresnel structure 31, by which the collimated imaging beam path is coupled out by being deflected in the direction of the inner surface 17 of the spectacle lens 3 in such a way that it emerges from the spectacle lens 3 through said inner surface refractively in the direction of the exit pupil 33 of the imaging optical unit. With the smartglasses 1 put in place, the exit pupil 33 is situated at the location of the pupil of the user's eye, of which the eye fulcrum 35 is illustrated in FIG. 2.

Figure 4:
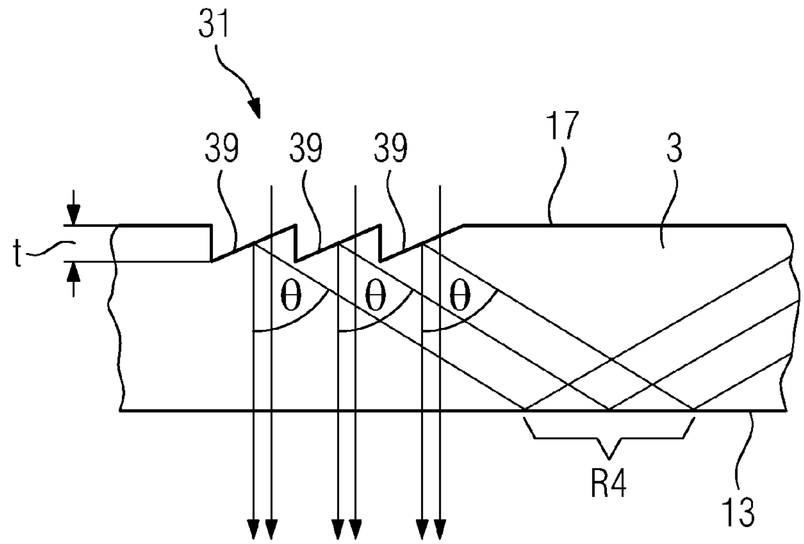
FIG. 4 shows a Fresnel structure such as is used in the smartglasses shown in FIG. 1.
Figure 5:
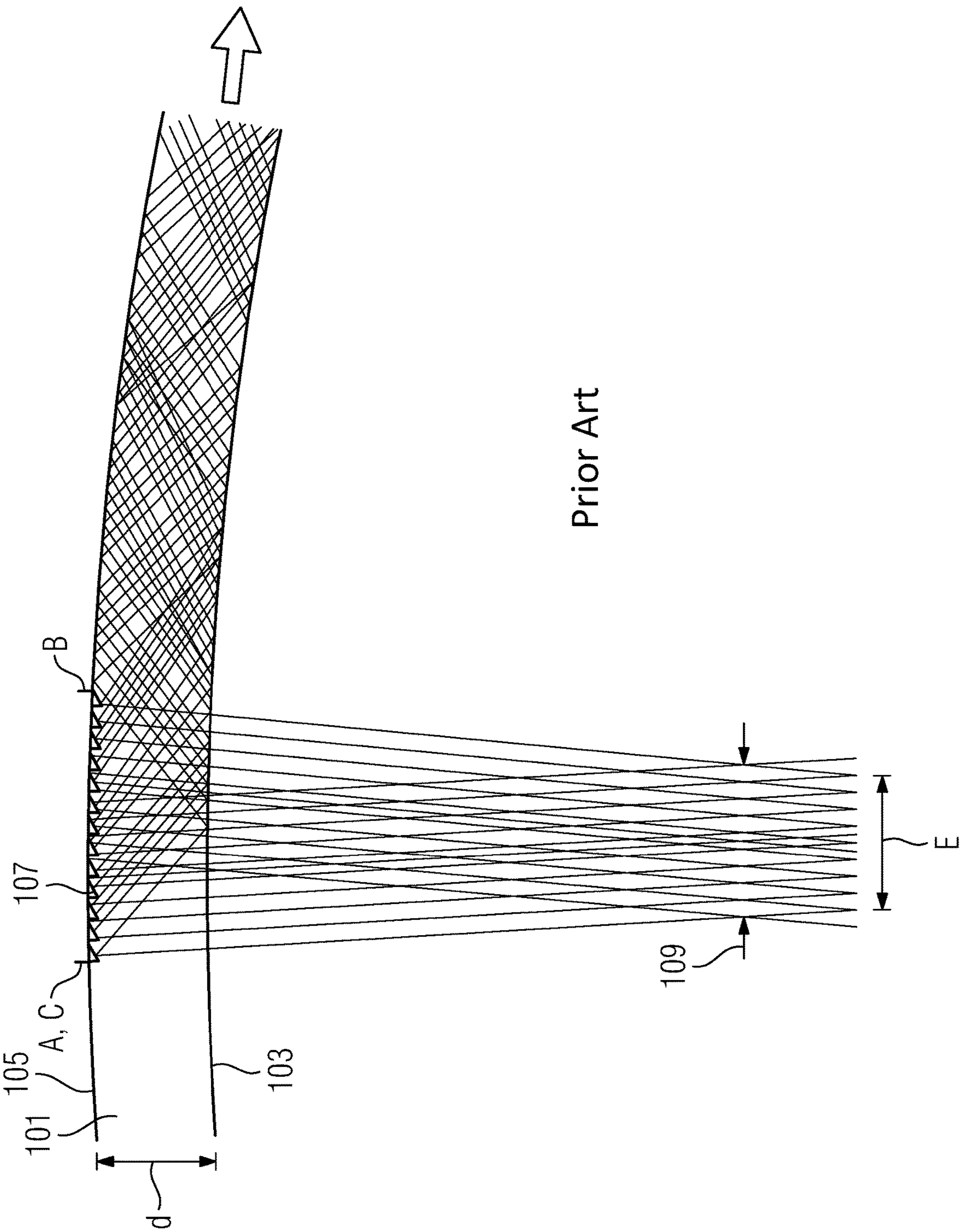
FIG. 5 shows an excerpt from an imaging beam path in smartglasses according to the prior art with a small field of view angle.
Figure 6:
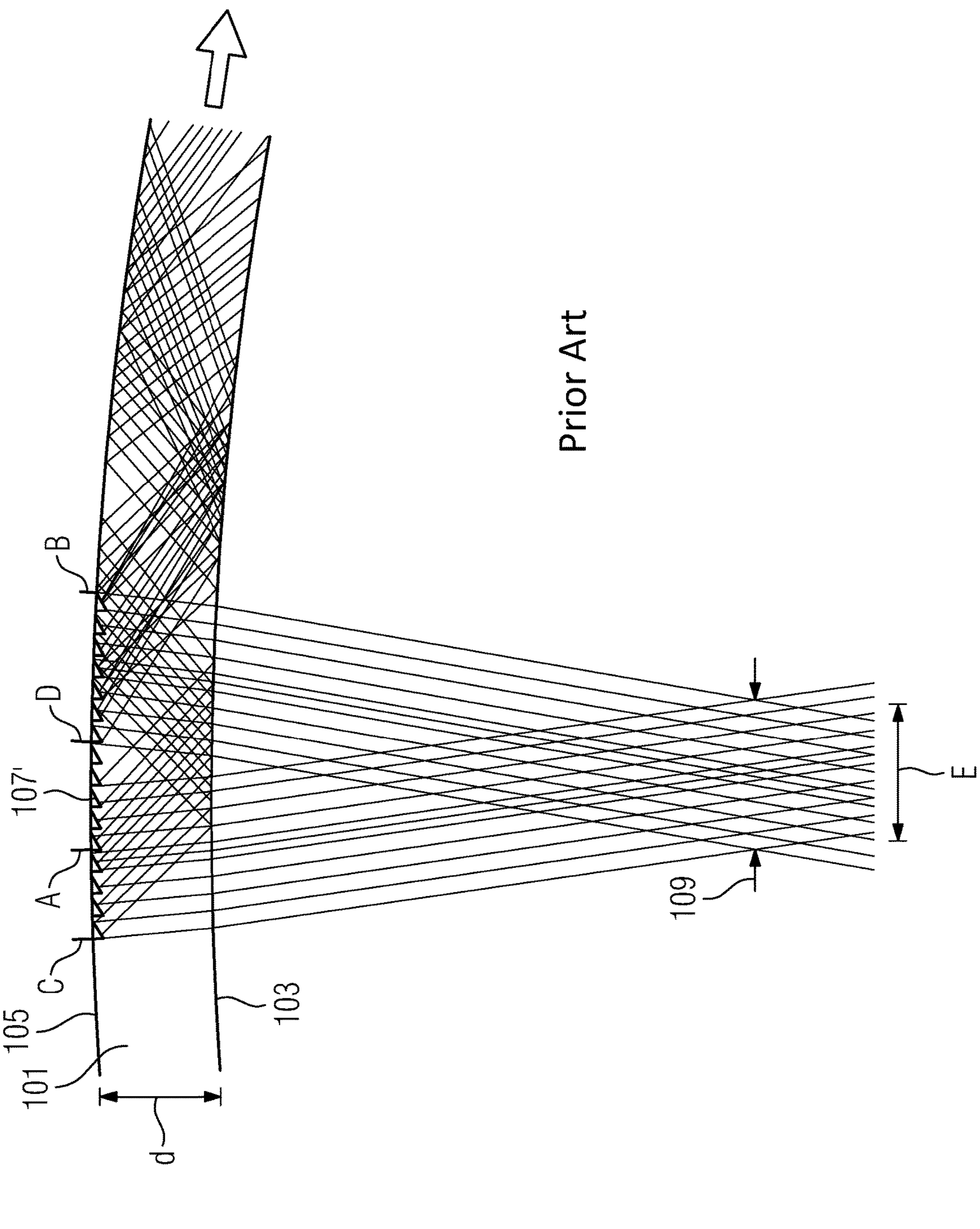
FIG. 6 shows an excerpt from an imaging beam path in smartglasses according to the prior art with a large field of view angle.

A Fresnel structure 31 such as can be used in the imaging optical unit of the smartglasses 1 is described in FIG. 4. The Fresnel structure 31 shown has facets 39, which, in the present exemplary embodiment, are oriented such that a zero ray of the imaging beam path that impinges on the facet 39 is reflected in the direction of the inner surface 17 of the spectacle lens 3 and the reflected zero ray forms an angle of θ=50 degrees with the incident zero ray. In the present exemplary embodiment, the facets 39 are partly reflectively coated, such that beams originating from the surroundings can pass through the partly reflectively coated facets 39 in the direction of the exit pupil 33. In this way, in the region of the exit pupil 33 a beam path is present in which the imaging beam path is superimposed with a beam path originating from the surroundings, such that a user of smartglasses 1 provided with the imaging optical unit is given the impression that the virtual image floats in the surroundings.

On the path to the Fresnel structure 31, four reflections take place in the spectacle lens 3 after the input coupling of the imaging beam path, of which reflections the first R1 takes place at the outer surface 17 of the spectacle lens 3, the second reflection R2 takes place at the inner surface 13 of the spectacle lens 3, the third reflection R3 takes place once again at the outer surface 17 of the spectacle lens 3 and the fourth reflection R4, finally, takes place again at the inner surface 13 of the spectacle lens 3. The Fresnel structure 31 is situated in the outer surface of the spectacle lens, to where the imaging beam path is reflected by the fourth reflection R4. By means of the Fresnel structure 31, the imaging beam path is then coupled out from the spectacle lens 3 in the direction of the exit pupil of the imaging optical unit as described. FIG. 3 shows a center ray and two marginal rays of a divergent beam emanating from the image generator 21. As a result of the collimation by means of the input coupling device 23, forming a collimation optical unit, a largely collimated beam path is present in the spectacle lens 23, and is then coupled out as a largely collimated beam path by the Fresnel structure 31.

Where the second reflection R2 takes place at the inner surface 13 of the spectacle lens 3, the spectacle lens 3 is provided with an edge thickening 37, that is to say that in this region the distance between the inner surface 13 and the outer surface 17 is greater than in the other regions of the spectacle lens 3, where the distance between the inner surface 13 and the outer surface 17 is substantially constant, provided that the spectacle lens 3 is not designed to correct defective vision. By contrast, if the spectacle lens 3 has a form that corrects defective vision, then the spectacle lens in the region of the edge thickening 37 can be thicker than would be necessary for correcting the defective vision. In order to minimize the impairment of the view through the edge thickening 37, the edge thickening is situated in an edge region of the spectacle lens, that is to say in a region which corresponds to a large visual angle and therefore lies at the edge of a user's field of view, where it is only slightly disturbing, if at all. The edge thickening 37 enables a smaller Footprint Overlap in comparison with a spectacle lens 3 without an edge thickening 37, which in turn enables a large field of view (FOV) and also a larger eyebox, without the spectacle lens having to be made thicker as a whole. Moreover, the edge thickening 37 makes it possible to intervene with regard to the imaging quality relatively near the pupil, for which reason the edge thickening 37 in the present exemplary embodiment has a freeform surface 41 in which a freeform shape defined by a polynomial is superimposed on the basic curvature of the inner surface 13 of the spectacle lens 3.

In the present exemplary embodiment, the reflections R1 to R4 at the inner surface 13 and the outer surface 17 of the spectacle lens are realized by total internal reflections at the inner surface 13 and the outer surface 17, which constitute in each case an interface with air, that is to say with an optically less dense medium. In principle, however, they can also be realized by reflective coatings on the inner surface 13 and the outer surface 17, but that would make the production of the spectacle lens more complex and thus more expensive. In principle, the reflections could also take place at reflective layers situated in the interior of the spectacle lens 3, but in terms of production that would be even more complex than coating the inner and outer surfaces of the spectacle lens.

In the present exemplary embodiment, the collimation optical unit of the imaging apparatus 23 and the spectacle lens 3 together with the Fresnel structure 31 form an imaging chain that can be classified into three regions. In this case, the first region is the collimation optical unit of the input coupling device 23, which has a focal length of between 20 and 30 mm and substantially performs the collimation of the imaging beam path emanating from the image generator 21.

The second region of the imaging chain is provided by the reflection surface of the edge thickening 37 of the spectacle lens 3, said reflection surface being embodied as a freeform surface 41. By virtue of its freeform design, said surface performs at least part of the correction of imaging aberrations in the imaging beam path. Moreover, in the region of the reflection surface of the edge thickening 37, the edge thickening 37 ensures that at the facets 39 of the Fresnel structure 31 the angle between a zero ray incident on a facet 39 and a zero ray reflected by the facet 39 does not become less than approximately 45 degrees. Angles of less than approximately 45 degrees would increase the Footprint Overlap.

The third region of the imaging chain is the Fresnel structure 31 with its facets 39. In the present exemplary embodiment, the facets 39 are embodied with freeform surfaces, that is to say that a freeform surface given by a polynomial in x and y is superimposed on the basic surface of the facets 39, wherein x and y represent coordinates of a coordinate system whose z-axis corresponds to the optical axis of the imaging beam path at the location of the facets 39. The focal length of the Fresnel structure 31 is greater than 80 mm in terms of absolute value, that is to say that the Fresnel surfaces have a predominantly deflecting function and practically no collimating function. Furthermore, by virtue of their freeform shape the Fresnel surfaces also serve for correcting imaging aberrations.

By virtue of the great segmentation of the Fresnel structure 31 with simultaneous proximity to the exit pupil 33, imaging aberrations would be influenced disadvantageously given a focal length of less than 80 mm. This effect is all the greater, the greater the depth t of the facets. A certain minimum depth is necessary, however, in order to provide the mutually incoherent Fresnel surfaces with a sufficiently large aperture. In the present exemplary embodiment, the depth t is 0.45 mm.

Besides the freeform surfaces of the facets 39 and the edge thickening 37, in the present exemplary embodiment the entrance surface 25, the first mirror surface 27 and the second mirror surface 29 of the input coupling optical unit 23 also have an imaging aberration-correcting function. For this purpose, these surfaces are embodied as freeform surfaces like the reflection surface 41 in the region of the edge thickening and the facets 39 of the Fresnel structure 31.

A concrete exemplary embodiment of an imaging optical unit according to the invention is specified below. In this exemplary embodiment, the inner surface 13 and the outer surface 17 of the spectacle lens 3 are spherical surfaces, wherein the radius of curvature of the inner surface 13 of the spectacle lens is 119.4 mm and the radius of curvature of the outer surface 17 of the spectacle lens is 120.0 mm. The thickness of the spectacle lens outside the edge thickening region is 4 mm. The material of the spectacle lens including the input coupling device produced monolithically with the spectacle lens is polycarbonate in the present exemplary embodiment.

In the concrete exemplary embodiment, in particular the shape of the freeform surfaces is explicitly specified, the coordinates of the individual surfaces being related in each case to a local coordinate system of the corresponding surface, the position and orientation of said system resulting from a translation and a rotation relative to the coordinate system of the exit pupil 33 (the coordinate system of the exit pupil is depicted in FIG. 2). Table 1 shows in each case the position and the orientation of the local coordinate system for the exit pupil 33, the output coupling surface A at the inner surface 13 of the spectacle lens 3, the Fresnel structure 31, the outer surface 17 of the spectacle lens 3, the surface 41 in the region of the edge thickening 37 of the spectacle lens 3, the surface of the image generator 21, the entrance surface 25 of the input coupling device, the first reflection surface 27 of the input coupling device and the second reflection surface 29 of the input coupling device. In this case, the translation of the respective local coordinate system relative to the coordinate system of the exit pupil 33 is given by the coordinates X, Y, Z (in mm) of the origin of the local coordinate system in the coordinate system of the exit pupil 33. The orientation of the respective local coordinate system in comparison with the orientation of the coordinate system of the exit pupil 33 is defined by a rotation about the axes of the coordinate system of the exit pupil 33, wherein the rotation of the local coordinate system is realized by a rotation about the x-axis of the coordinate system of the exit pupil 33, a subsequent rotation about the y-axis of the coordinate system of the exit pupil 33 and a final rotation about the z-axis of the coordinate system of the exit pupil 33. Table 1 shows, with regard to the rotations, in each case the rotation angles Dx, Dy, Dz about the x-axis, the y-axis and the z-axis of the coordinate system of the exit pupil 33.

TABLE 1

| Surface | X | Y | Z | Dx | Dy | Dz |
|---|---|---|---|---|---|---|
| 33 | 0.00 | 0.00 | 0.00 | 0.0000 | 0.0000 | 0.0000 |
| A | 0.00 | 0.00 | 15.83 | 4.4021 | 2.4659 | 0.0000 |
| 31 | −0.14 | 10.21 | 18.43 | 9.0287 | 2.6089 | 1.6685 |
| 17 | −0.15 | 10.24 | 18.62 | 9.0287 | 2.6089 | 1.6685 |

TABLE 1-continued

| Surface | X | Y | Z | Dx | Dy | Dz |
|---|---|---|---|---|---|---|
| 37 | −27.74 | 3.56 | 9.82 | −16.7066 | −40.1079 | 3.9576 |
| 29 | −37.047 | −0.26 | 3.94 | 74.1177 | −57.1390 | 85.3575 |
| 27 | −32.65 | 14.56 | 0.08 | 164.5010 | −30.9168 | 162.8878 |
| 25 | −36.21 | 14.73 | 1.16 | −135.2186 | −17.1487 | −166.7386 |
| 21 | −39.12 | 15.28 | 6.33 | −156.5923 | −48.2258 | 131.8230, |

The freeform surfaces of the Fresnel structure, of the input coupling surface 25, of the first mirror surface 27 and of the second mirror surface 29 satisfy the formula, $$z = \frac{cr^2}{1+\sqrt{1-(1+k)c^2r^2}} + \sum_{j=2}^{66} C_j x^m y^n \text{ where}$$

$$i = \frac{(m+n)^2 + m + 3n}{2} + 1$$

wherein z indicates the coordinate of the respective surface in the z-direction of the local coordinate system, x and y indicate the coordinates in the x- and y-directions of the local coordinate system, wherein $r^2=x^2+y^2$ holds true and k represents the so-called conic constant, c represents the curvature at the vertex of the surface, $C_j$ represent the coefficient of the j-th polynomial element and m and n represent integers. While the first summand of the formula describes a conic section surface, the second summand describes the freeform shape superimposed on the conic section surface. The conic constants for the freeform surface 41 of the edge thickening 37, the entrance surface 25 of the input coupling device 23, the first mirror surface 27 of the input coupling device 23 and the second mirror surface 29 of the input coupling device 23 are indicated in table 2 below. The coefficients $C_j$ are indicated in Table 3. Table 3 additionally contains the index j and the values for the integers m and n producing the index j.

TABLE 2

| Surface (reference numeral) | conic constant k |
|---|---|
| 41 | 0.000000e+000 |
| 29 | −1.330999e+001 |
| 27 | −4.140479e+001 |
| 25 | 7.034078e+000 |

TABLE 3

| m | n | j | Surface 41 | Surface 29 | Surface 27 | Surface 25 |
|---|---|---|---|---|---|---|
| 0 | 1 | 3 | −7.812228e−001 | −1.531215e−001 | −9.695834e−002 | −2.182048e−001 |
| 0 | 2 | 6 | 1.958740e−003 | 5.530905e−003 | 3.009592e−003 | 2.743847e−002 |
| 0 | 3 | 10 | 3.078706e−004 | 4.810893e−005 | −1.406214e−004 | 1.736766e−003 |
| 0 | 4 | 15 | 6.460063e−006 | −4.169802e−006 | −7.827152e−005 | −1.778852e−003 |
| 0 | 5 | 21 | −7.155882e−007 | 1.294771e−010 | −6.659100e−006 | −2.174033e−004 |
| 0 | 6 | 28 | 0.000000e+000 | 0.000000e+000 | 0.000000e+000 | 9.578189e−006 |
| 1 | 0 | 2 | 1.496710e+000 | 2.906973e−002 | 1.963331e−001 | 3.809971e−001 |
| 1 | 1 | 5 | 2.320350e−003 | 4.913123e−003 | 9.992371e−003 | −1.691716e−002 |
| 1 | 2 | 9 | −5.423841e−004 | 3.048980e−004 | 1.913540e−003 | −2.514755e−003 |
| 1 | 3 | 14 | −2.569728e−005 | 2.876553e−005 | 3.820120e−004 | 3.443101e−004 |
| 1 | 4 | 20 | −1.002203e−007 | −1.152883e−006 | 3.039797e−005 | 3.463227e−004 |
| 1 | 5 | 27 | 0.000000e+000 | 0.000000e+000 | 0.000000e+000 | 1.824457e−004 |
| 1 | 6 | 35 | 0.000000e+000 | 0.000000e+000 | 0.000000e+000 | 4.422777e−005 |
| 2 | 0 | 4 | 5.147623e−003 | −8.994150e−004 | −8.849176e−004 | −2.917254e−002 |
| 2 | 1 | 8 | 2.671193e−004 | −3.707353e−004 | −3.086351e−004 | −1.274667e−002 |
| 2 | 2 | 13 | 5.593883e−005 | −1.528543e−005 | −5.238054e−005 | −5.634069e−003 |

TABLE 3-continued

| m | n | j | Surface 41 | Surface 29 | Surface 27 | Surface 25 |
|---|---|---|---|---|---|---|
| 2 | 3 | 19 | 4.017967e−006 | 4.639629e−006 | 1.089040e−005 | −9.635637e−004 |
| 2 | 4 | 26 | 5.602905e−008 | −1.433568e−007 | 3.546340e−006 | −3.502309e−004 |
| 2 | 5 | 34 | 0.000000e+000 | 0.000000e+000 | 0.000000e+000 | −1.322886e−004 |
| 3 | 0 | 7 | −8.579227e−004 | 2.524392e−004 | −5.431761e−004 | −5.282344e−003 |
| 3 | 1 | 12 | −7.451077e−006 | −1.578617e−005 | 1.932622e−005 | −2.095379e−003 |
| 3 | 2 | 18 | −6.144115e−006 | −2.864958e−006 | −2.274442e−005 | 4.164574e−004 |
| 3 | 3 | 25 | −2.684070e−007 | 3.834197e−007 | −7.089393e−006 | 8.088923e−004 |
| 3 | 4 | 33 | 0.000000e+000 | 0.000000e+000 | 0.000000e+000 | 2.862418e−004 |
| 4 | 0 | 11 | 1.844420e−005 | 1.445034e−005 | 1.370185e−005 | −2.553006e−003 |
| 4 | 1 | 17 | 3.271372e−006 | −1.685033e−006 | 5.353489e−006 | −1.091894e−003 |
| 4 | 2 | 24 | 3.556975e−007 | −2.748172e−007 | 4.917033e−006 | −5.902346e−004 |
| 4 | 3 | 32 | 0.000000e+000 | 0.000000e+000 | 0.000000e+000 | −2.514605e−004 |
| 5 | 0 | 16 | −1.148306e−006 | 1.556132e−006 | −5.349622e−006 | −4.384465e−005 |
| 5 | 1 | 23 | −2.151692e−007 | 3.109116e−009 | −1.549379e−006 | 2.614591e−004 |
| 5 | 2 | 31 | 0.000000e+000 | 0.000000e+000 | 0.000000e+000 | 1.283256e−004 |
| 6 | 0 | 22 | 4.878059e−008 | 4.028435e−008 | 7.883487e−007 | −8.741985e−006 |
| 6 | 1 | 30 | 0.000000e+000 | 0.000000e+000 | 0.000000e+000 | −2.600512e−005 |
| 7 | 0 | 29 | 0.000000e+000 | 0.000000e+000 | 0.000000e+000 | 5.870927e−006 |

The freeform surfaces of the facets 39 of the Fresnel structure 31 satisfy the formula $$z = \sum_{j=1}^{66} C_j x^m y^n \text{ where } j = \frac{(m+n)^2 + m + 3n}{2}$$

In this case, $C_j$ represents the coefficients of the j-th polynomial element, m and n represent integers, and x and y represent the coordinates in the x- and y-directions of the local coordinate system. From the value for z obtained by means of the formula, an effective z-value (z-effective) is then determined, wherein determining z-effective is carried out in accordance with the following formula $$z\text{-effective}=\text{floor}(z,t),$$

wherein t stands for the depth of the Fresnel structure and the floor function ensures that the value for z does not lead to an exceedance of the maximum value for the depth t of the Fresnel structure 31, which is 0.45 mm in the present example. The coefficients $C_j$, the index j and the integers m, n, from which the index j is calculated, are indicated in Table 4.

TABLE 4

| j | m | n | $C_j$ |
|---|---|---|---|
| 2 | 0 | 1 | 0.145848 |
| 5 | 0 | 2 | 0.000945109 |
| 9 | 0 | 3 | 0.000084 |
| 14 | 0 | 4 | −0.000002 |
| 20 | 0 | 5 | −1.384164e−007 |
| 1 | 1 | 0 | −0.537173 |
| 4 | 1 | 1 | 0.000858145 |
| 8 | 1 | 2 | 0.000051 |
| 13 | 1 | 3 | −0.000007 |
| 19 | 1 | 4 | −0.000001 |
| 26 | 1 | 5 | −2.045896e−008 |
| 3 | 2 | 0 | −0.000696924 |
| 7 | 2 | 1 | 0.000078 |
| 12 | 2 | 2 | 0.00001 |
| 18 | 2 | 3 | 0.000001 |
| 25 | 2 | 4 | 1.860516e−008 |
| 6 | 3 | 0 | −0.000054 |
| 11 | 3 | 1 | −0.000021 |
| 17 | 3 | 2 | −0.000002 |
| 24 | 3 | 3 | −8.679409e−008 |

TABLE 4-continued

| j | m | n | $C_j$ |
|---|---|---|---|
| 10 | 4 | 0 | 0.000002 |
| 16 | 4 | 1 | 0.000001 |
| 23 | 4 | 2 | 7.693742e−008 |
| 15 | 5 | 0 | −0.000001 |
| 22 | 5 | 1 | −6.366967e−008 |

The concrete exemplary embodiment described makes it possible to achieve the following characteristic variables for the imaging apparatus:

Field of View (FOV): 13 degrees×7.3 degrees (Diagonal 15 degrees)

Size of the eyebox: 8 mm×10 mm

Size of the image generator: 6.4 mm×4.8 mm (used 6.4 mm×3.6 mm)

virtual object distance: 3 m

Spectacle lens thickness: 4 mm

The concept underlying the invention, which concept has been described with reference to the exemplary embodiments, makes it possible, without a relatively great outlay, to increase the field of view in the y-direction, that is to say that the value of 7.3 degrees could be increased as necessary to at least 10 degrees. The same applies to the eyebox as well. Here the value could be enhanced from 10 mm to 15 mm.

The present invention has been described in detail on the basis of concrete exemplary embodiments for explanation purposes. It goes without saying, however, that the invention is not intended to be exclusively restricted to the present exemplary embodiments. In particular, deviations from the exemplary embodiments described are possible. In this regard, the deflection of the rays at the facets of the Fresnel structure can assume an arbitrary value in the range of between 45 and 55 degrees. Likewise, the depth t of the Fresnel zones can have an arbitrary value in the range of between 0.35 and 0.5 mm. The radii of curvature of the inner surface and the outer surface of the spectacle lens can also deviate from the value indicated. In particular, they can be between 100 and 150 mm. Moreover, the radii of curvature of the outer surface and of the inner surface can differ from one another more distinctly than is the case in the present exemplary embodiment, particularly if defective vision is also intended to be corrected by the spectacle lens. Finally, it should also be noted that, in the smartglasses 1 according to the invention, the second spectacle lens 5 can also be part of a second imaging optical unit according to the invention, which corresponds to the imaging optical unit described. The image generator for this would then be arranged between the second spectacle earpiece 11 and the second spectacle lens 5. Therefore, the present invention is intended to be restricted only by the appended claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An imaging optical unit for generating a virtual image of an initial image represented on an image generator, comprising:

at least one spectacle lens, including an inner surface that faces an eye of a user and an outer surface that faces away from the eye of the user;

an input coupler that is configured to couple an imaging beam path emanating from the initial image into the spectacle lens in between the inner surface and the outer surface of the spectacle lens; and a Fresnel structure present in the spectacle lens that is configured to couple the imaging beam path out from the spectacle lens towards the eye of the user, wherein the input coupler is configured to couple the imaging beam path such that the imaging beam path is guided by reflections between the inner surface and the outer surface to the Fresnel structure, wherein the imaging beam path comprises a plurality of rays, wherein the Fresnel structure includes Fresnel surfaces configured to provide a base deflection of the plurality of rays of the imaging beam path of 45 to 55 degrees, wherein the input coupler is configured to couple the imaging beam path in between the inner surface and the outer surface of the spectacle lens such that the imaging beam path is guided via exactly four reflections to the Fresnel structure, and each of the exactly four reflections takes place at either of the inner surface or the outer surface of the spectacle lens, wherein an edge thickening region is provided in the spectacle lens between the input coupler and the Fresnel structure, in which a thickness of the spectacle lens is greater than a thickness in the region of the Fresnel structure, and wherein the input coupler is configured to couple the imaging beam path in between the inner surface and the outer surface of the spectacle lens such that a first reflection occurs after the input coupling at the outer surface of the spectacle lens and a second reflection occurs after the input coupling at a reflection surface arranged on the inner side of the spectacle lens in the edge thickening region.

2. The imaging optical unit of claim 1, wherein the Fresnel structure has a focal length of at least 80 mm.

3. The imaging optical unit of claim 1, wherein the Fresnel surfaces have Fresnel zone depths in a range of 0.35 mm to 0.5 mm.

4. The imaging optical unit of claim 1, wherein the spectacle lens has a radius of curvature in the range of 100 mm to 150 mm.

5. The imaging optical unit of claim 1, wherein the spectacle lens and the input coupler form a monolithic unit.

6. Smartglasses comprising an imaging optical unit for generating a virtual image as claimed in claim 1.

7. The imaging optical unit of claim 1, wherein the reflection surface arranged on the inner surface of the spectacle lens in the edge thickening region has a freeform surface that at least partly corrects imaging aberrations.

8. The imaging optical unit of claim 7, wherein the reflection surface arranged on the inner surface of the spectacle lens in the edge thickening region defines a conic section thereof on which the freeform surface is superimposed.

9. The imaging optical unit of claim 1, wherein a collimator that collimates the imaging beam path is integrated into the input coupler.

10. The imaging optical unit of claim 9, wherein the collimator has a focal length in a range of 20 mm to 30 mm.

11. The imaging optical unit of claim 9, wherein the input coupler comprises an entrance surface, a first mirror surface and a second mirror surface, wherein at least one of the entrance surface, the first mirror surface and the second mirror surface forms the collimator.

12. The imaging optical unit of claim 11, wherein at least one of the first mirror surface, the second mirror surface and the entrance surface has a freeform surface that at least partly corrects imaging aberrations.

13. The imaging optical unit of claim 12, wherein at least one of the first mirror surface, the second mirror surface and the entrance surface of the input coupler defines a conic section thereof on which the freeform surface is superimposed.

14. An imaging optical unit for generating a virtual image of an initial image represented on an image generator, comprising:

at least one spectacle lens, including an inner surface that faces an eye of a user and an outer surface that faces away from the eye of the user;

an input coupler that that is configured to couple an imaging beam path emanating from the initial image into the spectacle lens in between the inner surface and the outer surface of the spectacle lens; and a Fresnel structure present in the spectacle lens that is configured to couple the imaging beam path out from the spectacle lens towards the eye of the user, wherein the input coupler is configured to couple the imaging beam path such that the imaging beam path is guided by reflections between the inner surface and the outer surface to the Fresnel structure, wherein the imaging beam path comprises a plurality of rays, wherein the Fresnel structure includes Fresnel surfaces configured to provide a base deflection of the plurality of rays of the imaging beam path of 45 to 55 degrees, and wherein the input coupler is configured to couple the imaging beam path in between the inner surface and the outer surface of the spectacle lens such that the imaging beam path is guided via at most four reflections to the Fresnel structure, and each of the exactly four reflections takes place at either of the inner surface or the outer surface of the spectacle lens wherein an edge thickening region is provided in the at least spectacle lens between the input coupler and the Fresnel structure, in which a thickness of the at least one spectacle lens is greater than a thickness in the region of the Fresnel structure, and wherein the input coupler is configured to couple the imaging beam path in between the inner surface and the outer surface of the at least one spectacle lens such that a first reflection occurs after the input coupling at the outer surface of the at least one spectacle lens and a second reflection occurs after the input coupling at a reflection surface arranged on the inner side of the at least one spectacle lens in the edge thickening region.

15. The imaging optical unit of claim 14, wherein both of the inner surface and the outer surface of the spectacle lens are curved.

* * * * *